US011009688B2

(12) United States Patent
Sudoh

(10) Patent No.: US 11,009,688 B2
(45) Date of Patent: May 18, 2021

(54) IMAGE FORMING LENS, IMAGING APPRATUS, INSPECTION APPARATUS

(71) Applicant: Yoshifumi Sudoh, Wako (JP)

(72) Inventor: Yoshifumi Sudoh, Wako (JP)

(73) Assignee: Ricoh Company, Ltd., Tokyo (JP)

( * ) Notice: Subject to any disclaimer, the term of this patent is extended or adjusted under 35 U.S.C. 154(b) by 235 days.

(21) Appl. No.: 15/828,013

(22) Filed: Nov. 30, 2017

(65) Prior Publication Data
US 2018/0275380 A1 Sep. 27, 2018

(30) Foreign Application Priority Data
Mar. 21, 2017 (JP) .............................. JP2017-054423

(51) Int. Cl.
*G02B 15/14* (2006.01)
*G02B 13/00* (2006.01)
*G02B 9/64* (2006.01)

(52) U.S. Cl.
CPC ....... *G02B 15/1421* (2019.08); *G02B 13/005* (2013.01); *G02B 13/0045* (2013.01); *G02B 15/142* (2019.08); *G02B 9/64* (2013.01)

(58) Field of Classification Search
CPC .............. G02B 15/142; G02B 15/1421; G02B 15/163; G02B 13/005; G02B 9/64; G02B 13/0045
USPC ........ 359/691, 682, 692, 748, 753, 793–795
See application file for complete search history.

(56) References Cited

U.S. PATENT DOCUMENTS

| | | | |
|---|---|---|---|
| 7,636,201 B2 | 12/2009 | Sudoh et al. | |
| 7,864,443 B2 | 1/2011 | Sudoh et al. | |
| 7,869,143 B2 | 1/2011 | Sudoh | |
| 8,018,663 B2 | 9/2011 | Ohashi et al. | |
| 8,139,297 B2 | 3/2012 | Sudoh | |
| 8,284,501 B2 | 10/2012 | Sudoh | |
| 8,369,030 B2 | 2/2013 | Sudoh et al. | |
| 8,379,329 B2 | 2/2013 | Nakayama et al. | |
| 8,405,917 B2 | 3/2013 | Sudoh | |
| 8,493,665 B2 | 7/2013 | Sudoh | |

(Continued)

FOREIGN PATENT DOCUMENTS

| | | |
|---|---|---|
| JP | 60-100115 A | 6/1985 |
| JP | 3-141313 A | 6/1991 |

(Continued)

OTHER PUBLICATIONS

Office Action dated Oct. 20, 2020 in corresponding Japanese Patent Application No. 2017-054423, 3 pages.

*Primary Examiner* — Travis S Fissel

(74) *Attorney, Agent, or Firm* — Oblon, McClelland, Maier & Neustadt, L.L.P.

(57) ABSTRACT

An image forming lens includes a first lens group and a second lens group. The first lens group has positive refractive power moved toward the object side when focusing from a long distance to a short distance. The second lens group has positive refractive power arranged closer to the image side than the first lens group. The second lens group includes, in order from the object side to the image side, a negative lens having a concave surface on the image side, a negative meniscus lens having a concave surface on the object side, and a positive lens. The focal length f21 of the negative lens and the focal length f22 of the negative meniscus lens satisfy the following conditional expression: (1) $0.1 < f21/f22 < 0.5$.

13 Claims, 9 Drawing Sheets

(56) References Cited

U.S. PATENT DOCUMENTS

| | | | |
|---|---|---|---|
| 8,553,335 B2 | 10/2013 | Sudoh | |
| 9,170,398 B2 | 10/2015 | Sudoh | |
| 9,195,036 B2 | 11/2015 | Sudoh | |
| 9,213,172 B2 | 12/2015 | Sudoh | |
| 9,297,988 B2 | 3/2016 | Sudoh | |
| 9,325,907 B2 | 4/2016 | Sudoh | |
| 9,329,367 B2 | 5/2016 | Sudoh | |
| 9,690,072 B2 | 6/2017 | Sudoh | |
| 9,772,469 B2 | 9/2017 | Sudoh | |
| 9,864,167 B2 | 1/2018 | Ohashi et al. | |
| 2005/0157403 A1* | 7/2005 | Sato | G02B 27/646 359/687 |
| 2016/0252706 A1* | 9/2016 | Yamanaka | G02B 9/64 359/754 |

FOREIGN PATENT DOCUMENTS

| | | |
|---|---|---|
| JP | 8-86957 A | 4/1996 |
| JP | 8-248310 A | 9/1996 |
| JP | 2010-204621 A | 9/2010 |
| JP | 2013-137377 A | 7/2013 |
| JP | 2013-156459 A | 8/2013 |
| JP | 2014-123146 A | 7/2014 |
| JP | 2016-61903 A | 4/2016 |
| JP | 2016-61919 A | 4/2016 |

* cited by examiner

IMAGE FORMING LENS, IMAGING APPRATUS, INSPECTION APPARATUS

CROSS-REFERENCE TO RELATED APPLICATIONS

This patent application is based on and claims priority pursuant to 35 U.S.C. § 119(a) to Japanese Patent Application No. 2017-054423, filed on Mar. 21, 2017 in the Japan Patent Office, the entire disclosures of which is hereby incorporated by reference herein.

BACKGROUND

Technical Field

Improvement in the number of pixels of image pickup devices have been rapidly advanced. In addition, in recent years, cameras having a large-sized image pickup element to obtain high image quality are increasing.

In the image pickup apparatus using such a large-sized image pickup element, the overall length and diameter of the entire imaging optical system tends to be increased. On the other hand, in order to miniaturize the size of the entire apparatus, the inventors have determined that a high-precision imaging lens that secures sufficient back focus and reduces spherical aberration, comatic aberration, axial chromatic aberration, and color difference by comatic aberration is required.

SUMMARY

In one aspect of this disclosure, there is provided an improved image forming lens includes a first lens group and a second lens group. The first lens group has positive refractive power moved toward the object side when focusing from a long distance to a short distance. The second lens group has positive refractive power arranged closer to the image side than the first lens group. The second lens group includes, in order from the object side to the image side, a negative lens having a concave surface on the image side, a negative meniscus lens having a concave surface on the object side, and a positive lens. The focal length f21 of the negative lens and the focal length f22 of the negative meniscus lens satisfy the following conditional expression: (1) 0.1<f21/f22<0.5.

BRIEF DESCRIPTION OF THE DRAWINGS

The aforementioned and other aspects, features, and advantages of the present disclosure will be better understood by reference to the following detailed description when considered in connection with the accompanying drawings, wherein.

DETAILED DESCRIPTION

Figure 1:
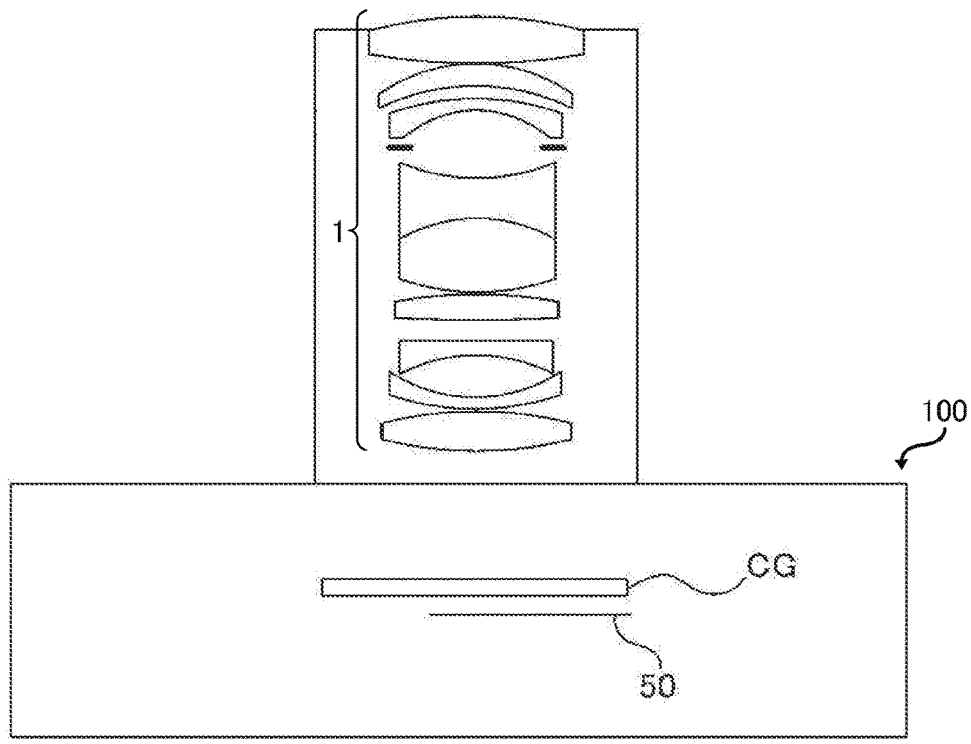
FIG. 1 is a diagram for describing an example of an embodiment of an imaging apparatus.

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

FIG. 1 shows an image pickup apparatus 100 including an imaging lens 1 as an example of an embodiment of the present invention. The imaging apparatus 100 includes an imaging lens 1 having a two-group configuration and an imaging element 50 for recognizing the light transmitted through the imaging lens 1 as an image. The imaging element 50 may be implemented as a CCD or CMOS sensor, for example. Further, specific configurations of the embodiment of the present invention are exemplified in FIGS. 2 to 5. It should be noted that, in FIGS. 2 to 5, the left side of the figure is the object side, and the right side of the figure is the image side. Also, in order to avoid complication, reference numerals are commonly used in FIGS. 1 to 5.

Figure 2:
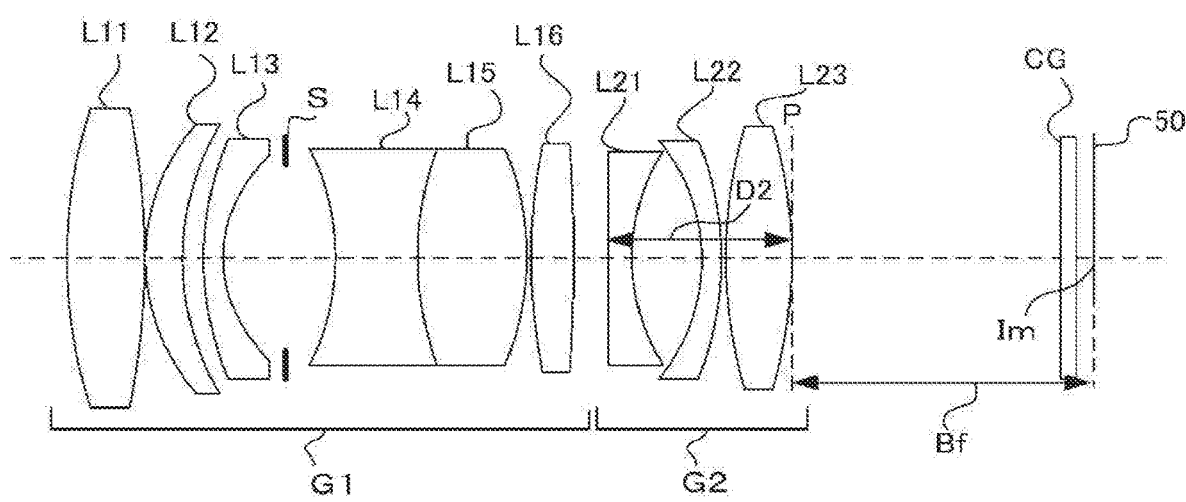
FIG. 2 is a diagram for explaining an imaging lens of Example 1.
Figure 3:
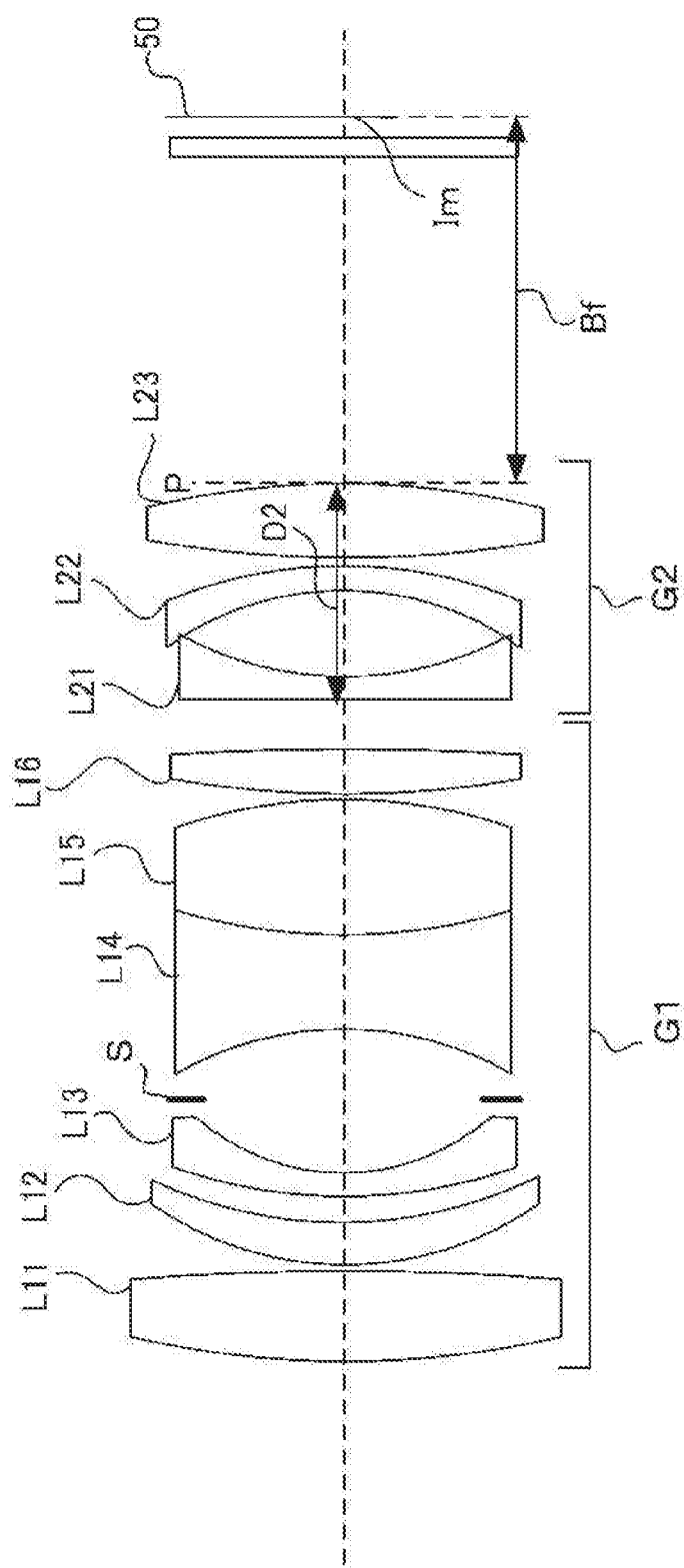
FIG. 3 is a view for explaining an imaging lens according to Example 2.
Figure 4:
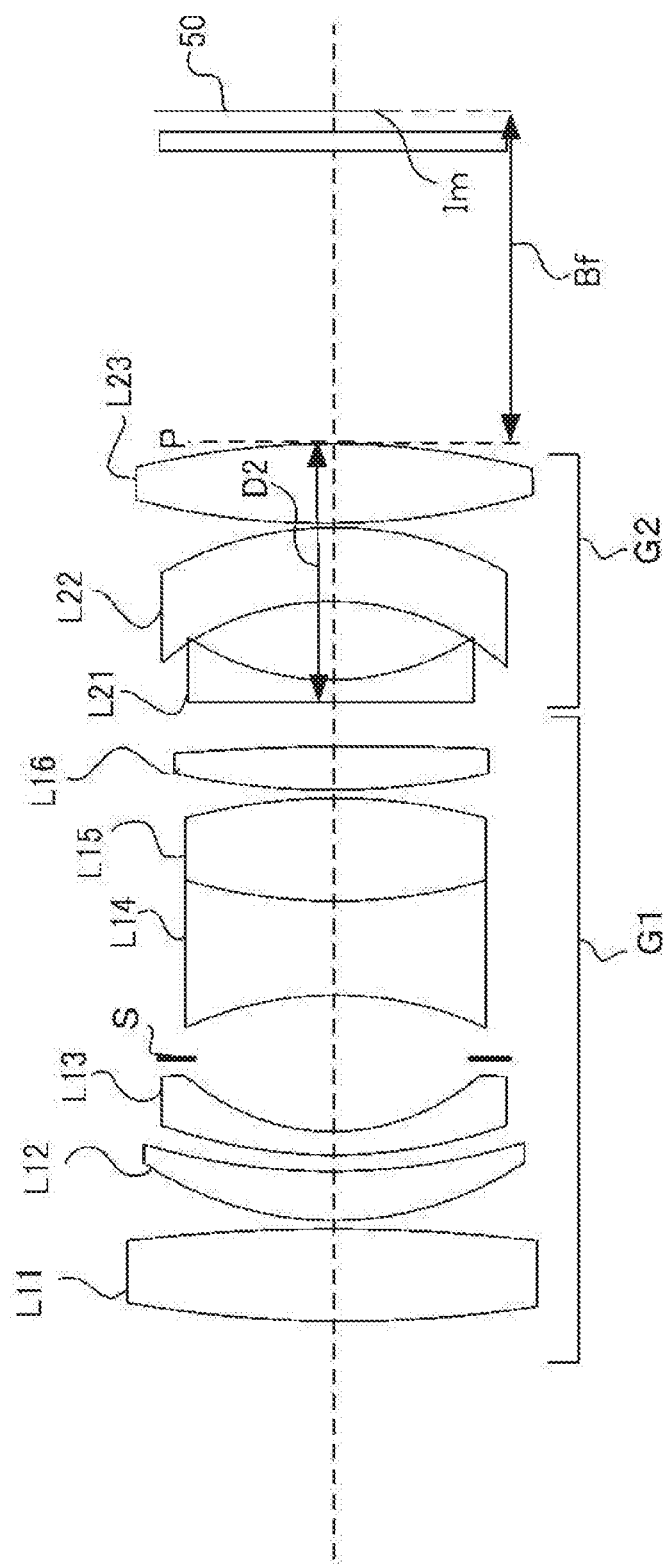
FIG. 4 is a diagram for explaining an imaging lens of Example 3.
Figure 5:
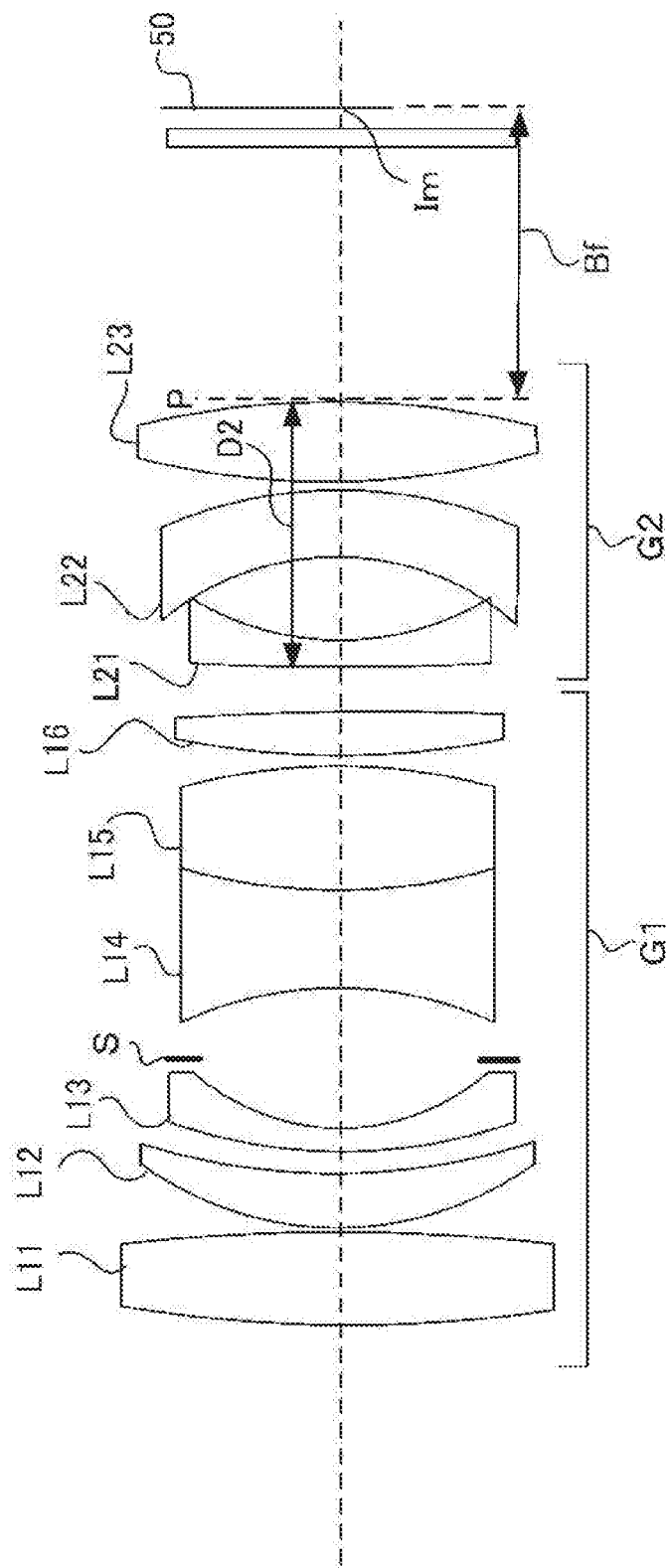
FIG. 5 is a view for explaining an imaging lens of Example 4.
Figure 6A:
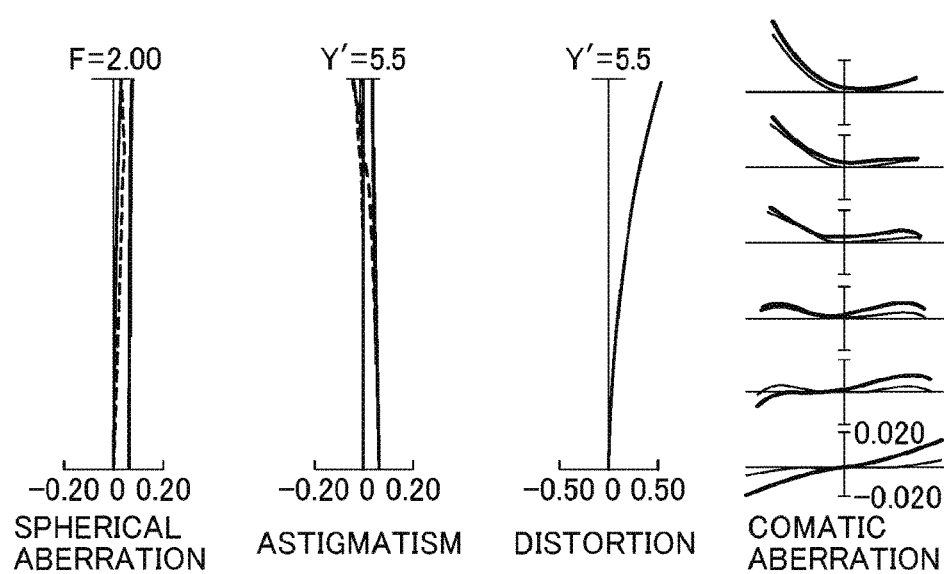
FIGS. 6A-6C are an example of an aberration diagram of the imaging lens of Example 1.
Figure 6B:
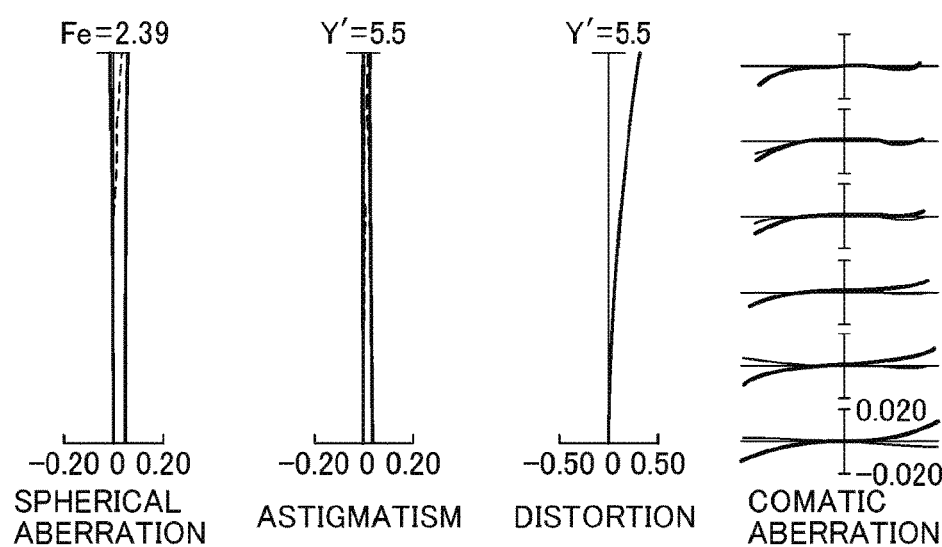
Figure 6C:
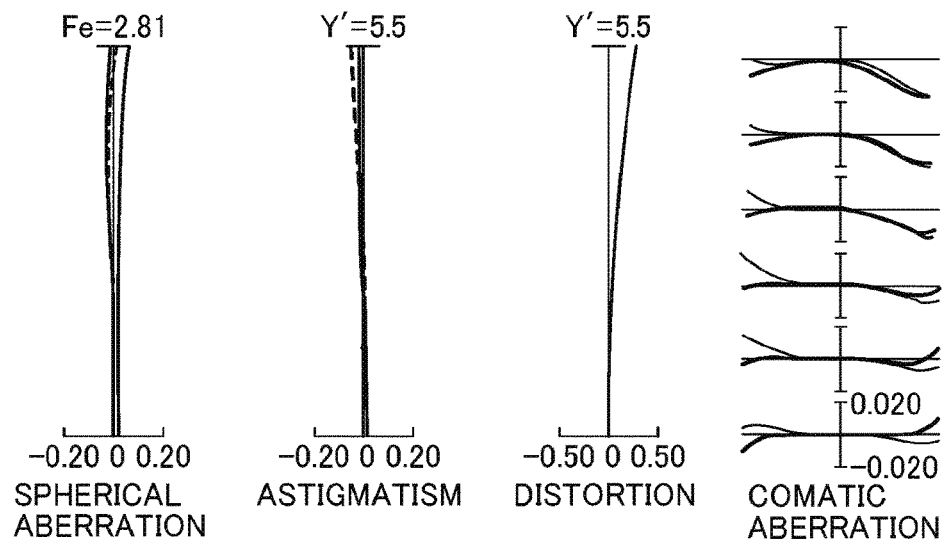
Figure 7A:
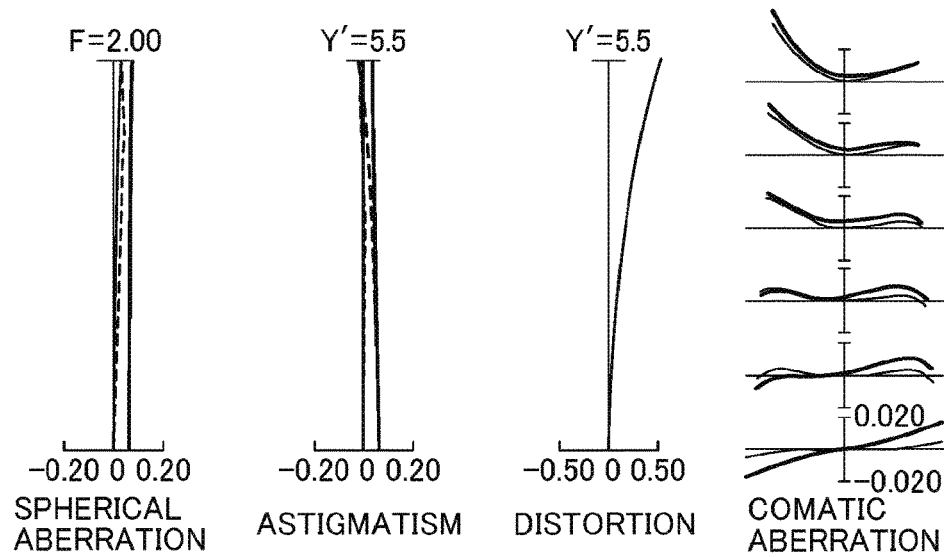
FIGS. 7A-7C are an example of an aberration diagram of an imaging lens of Example 2.
Figure 7B:
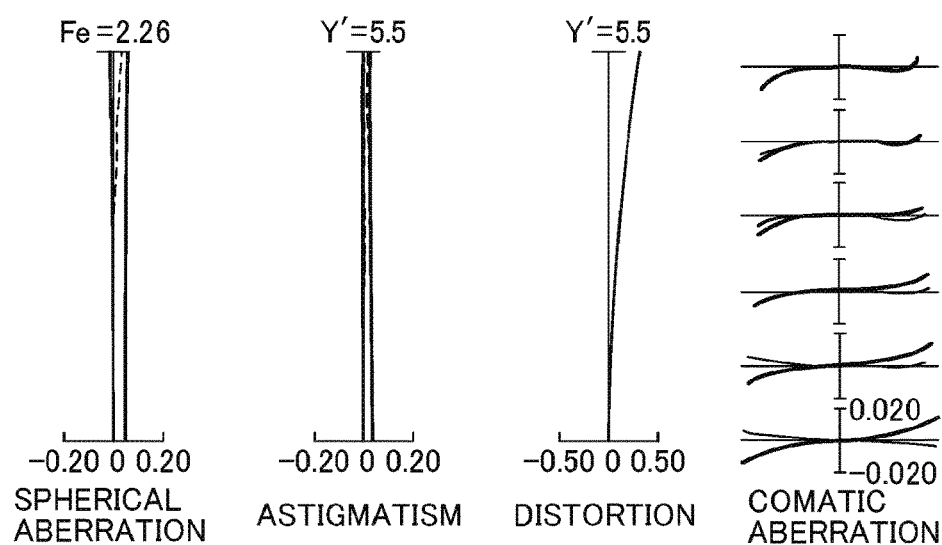
Figure 7C:
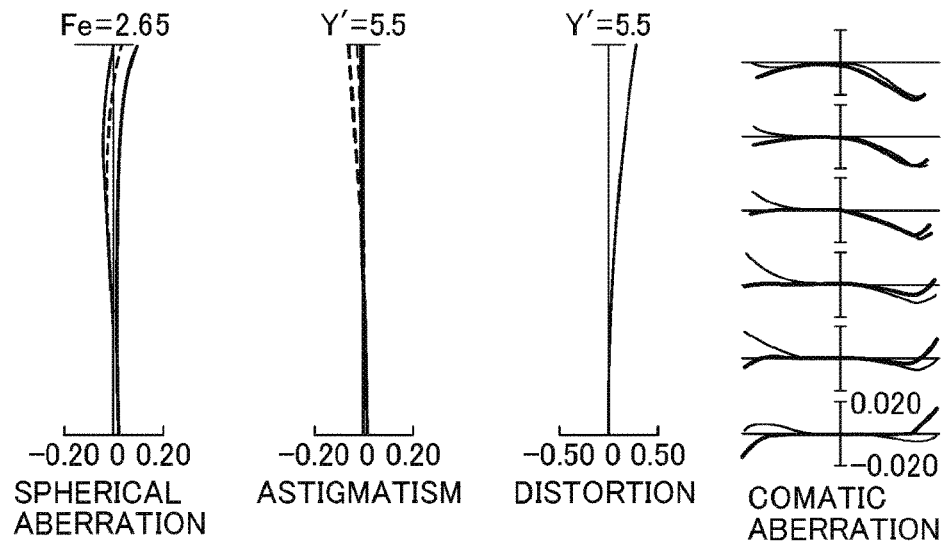
Figure 8A:
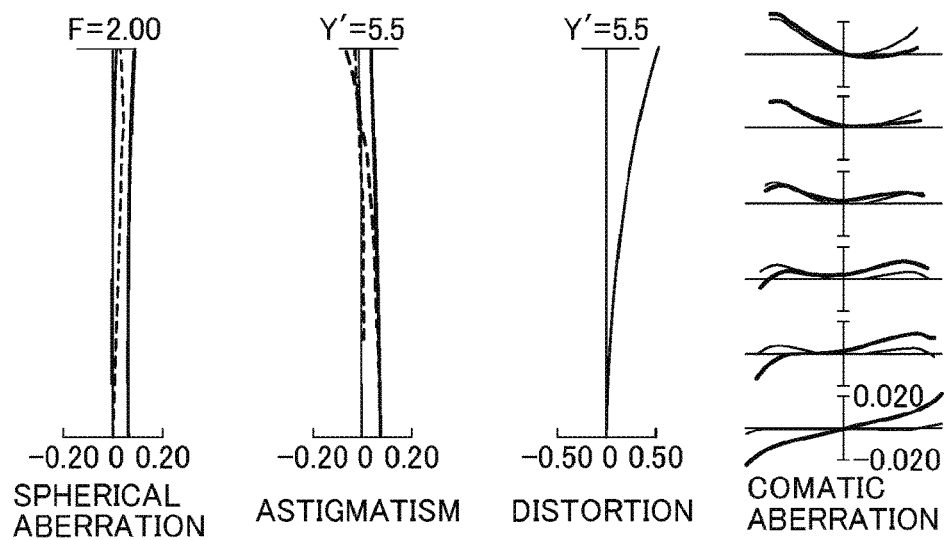
FIGS. 8A-8C are an example of an aberration diagram of an imaging lens of Example 3.
Figure 8B:
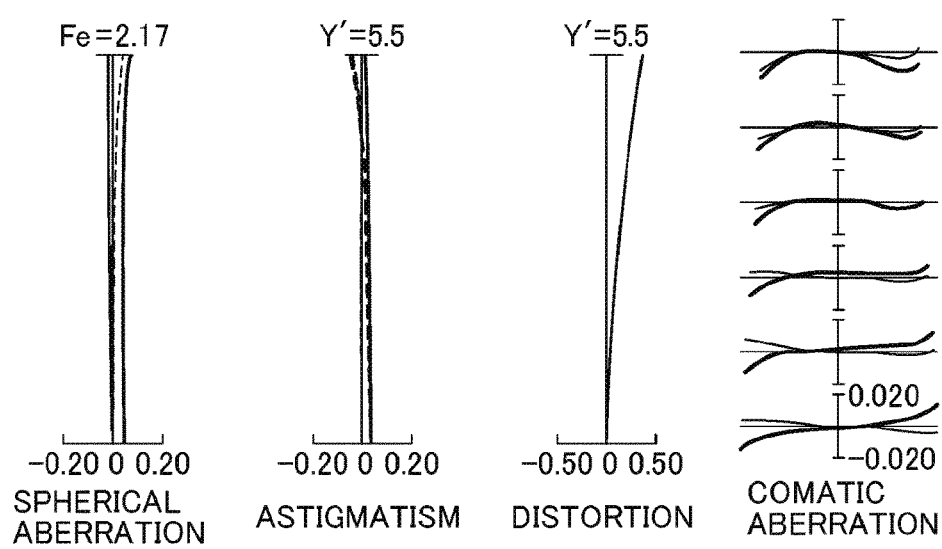
Figure 8C:
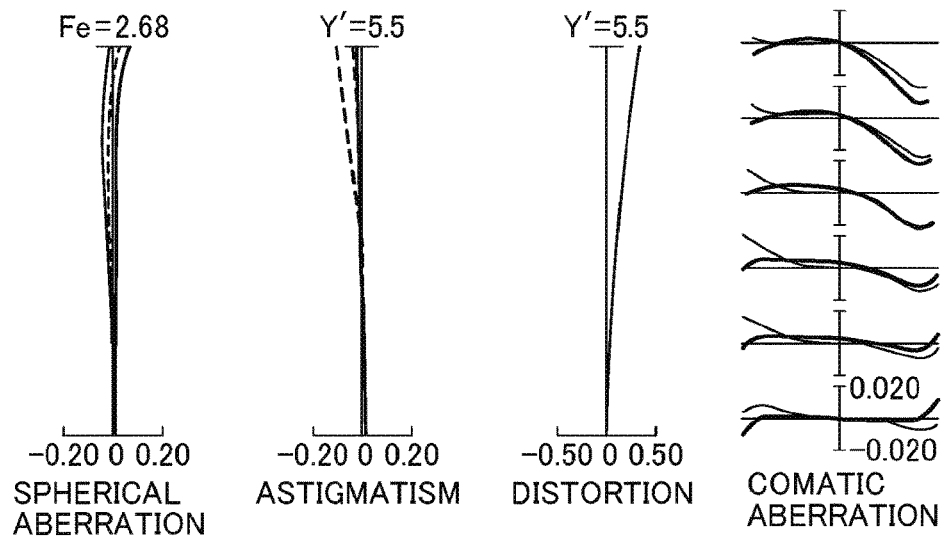
Figure 9A:
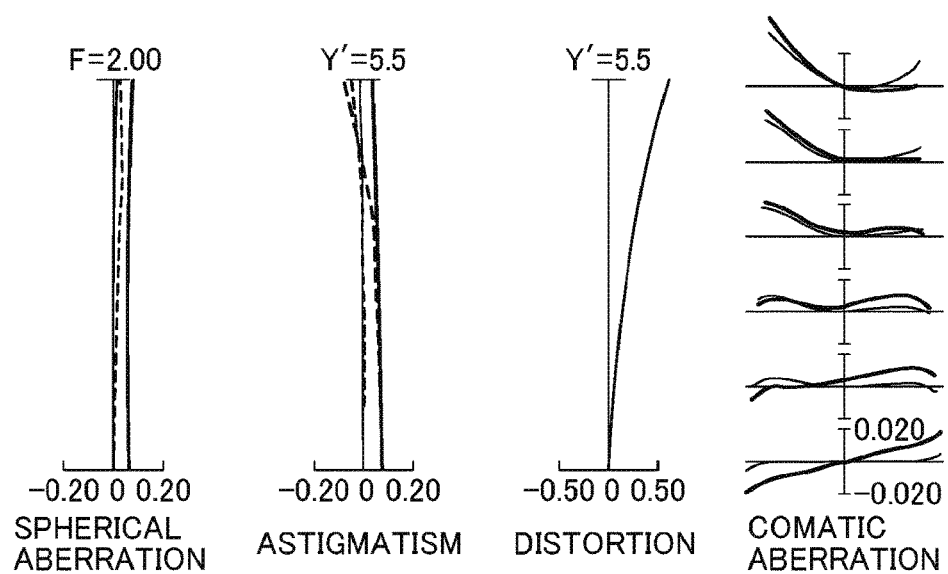
FIGS. 9A-9C are an example of an aberration diagram of an imaging lens of Example 4.
Figure 9B:
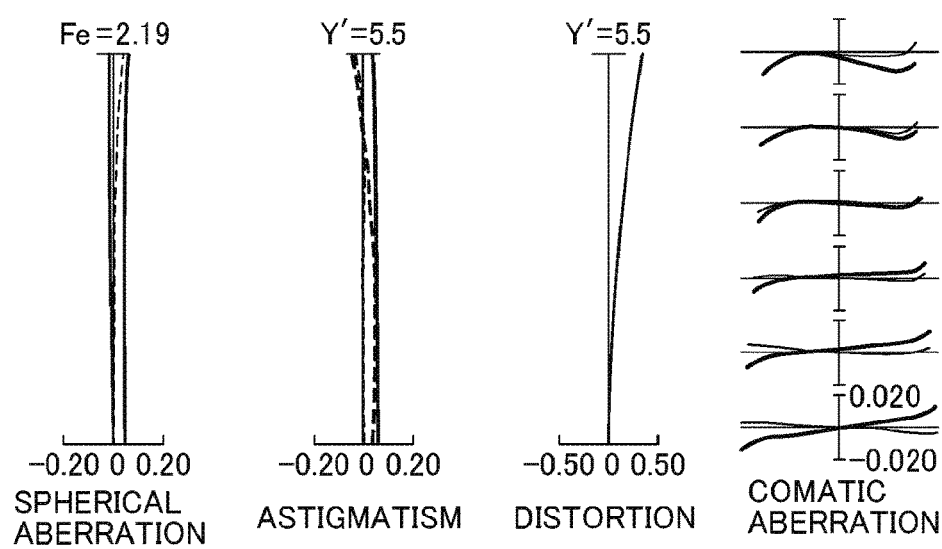
Figure 9C:
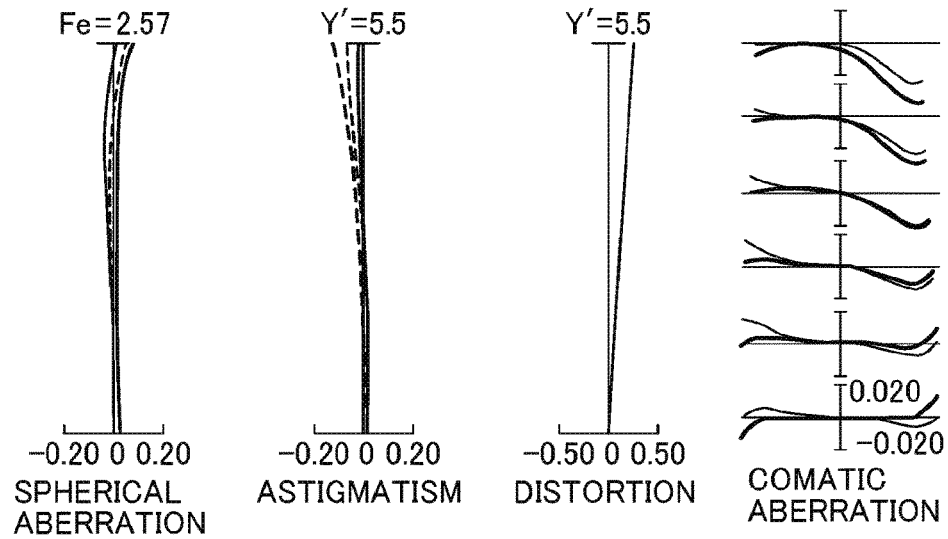

As shown in FIG. 2, the imaging lens 1 has a first lens group G1 and a second lens group G2 both of which are formed by a plurality of lenses. The first lens group G1 moves to the object side during focusing from an infinite object to a close object. The second lens group G2 includes, in order from the object side to the image side, a negative lens L21 having a concave surface on the image side, a negative meniscus lens L22 having a concave surface on the object side, and a positive lens L23.

In the following description, reference symbol G1 denotes "first lens group", reference symbol G2 denotes "second lens group", and symbol S denotes "aperture stop". In addition, the symbol Im indicates the "image plane". The first lens group G1 can be composed of a positive lens L11, a positive lens L12, a negative lens L13, an aperture stop S, a negative lens L14, a positive lens L15, and a positive lens L16 in order from the object side to the image side. In this way, by making the first lens group G1 a lens group having a symmetrical power arrangement with respect to the aperture stop S, various aberrations can be sufficiently corrected and a high-precision imaging lens can be obtained.

Regarding to the imaging lens 1 of the present embodiment, it is assumed that the imaging device 50 is used for forming the image, and the reference symbol CG in FIG. 2 to FIG. 5 indicates "cover glass of the imaging device".

The cover glass CG is "parallel flat plate shape", and the light receiving surface of the image pickup element 50 coincides with the image plane Im.

The cover glass CG has a function of shielding and protecting the light receiving surface of the image pickup element 50, but it may also have the function of an infrared cut filter or the like.

Both the first lens group G1 and the second lens group G2 have a positive refractive power.

The negative lens L21 is a lens having at least a concave surface shape with a radius of curvature R212 on the image side and a negative power with a focal length f21. The negative meniscus lens L22 is a meniscus-shaped lens whose object side surface has a concave shape with a radius of curvature R221 and a negative power with a focal length f22. The positive lens L23 is a lens having positive power, and in the present embodiment, it is a biconvex lens.

In the imaging lens 1, the focal length f21 of the negative lens L21 and the focal length f22 of the negative meniscus lens L22 satisfy the following conditional expression (1).

$$0.1 < f21/f22 < 0.5 \qquad (1)$$

By setting the focal length of the negative lens L21 and the focal length of the negative meniscus lens L22 within the range of the conditional expression (1), the negative power of the second lens group can be attained by sharing the negative power to the negative lens L21 and the negative meniscus lens L22. With such a configuration, the aberration in the second lens group G2 can be sufficiently corrected. If the upper limit value of the conditional expression is exceeded, the aberration generated in the negative meniscus lens L22 increases. On the other hand, if it falls below the lower limit value of the conditional expression, the aberration generated in the negative lens L21 increases. Therefore, in either case, it tends to be difficult to correct aberrations in the second lens group G2. It should be noted that it is desirable to be in the range of $0.15 < f21/f22 < 0.45$.

Further, in the imaging lens 1, assuming that Bf is the air-converted optical path length from the most image side surface P of the second lens group G2 to the image surface Im and D2 is the axial thickness of the second lens group G2, conditional expression (2) is satisfied.

$$0.8 < Bf/D2 < 2.0 \qquad (2)$$

Note that the "air-converted optical path length from the most image side surface P of the second lens group G2 to the image surface Im" indicates the so-called back focus. In the present embodiment, "the axial thickness of the second lens group G2" indicates the length from the object side lens surface of the negative lens L21 on the optical axis to the image side lens surface of the positive lens L23 in this embodiment.

In conditional expression 2, if the axial thickness of the second lens group G2 becomes too small, it is difficult to reduce the aberration in the second lens group G2 even if the back focus value is appropriate. Similarly, if the axial thickness of the second lens group G2 is set to be large, the axial thickness of the first lens group G1 must be thinned, and correction of aberrations is also difficult. Therefore, by defining the air-converted optical path length Bf and the axial thickness D2 within an appropriate range so as to satisfy the conditional expression 2, a high-precision imaging lens can be obtained without increasing the size of the entire lens. It should be noted that it is more desirable to be the conditional expression (2) within the range of $1.0 < Bf/D2 < 1.8$.

Further, in the present embodiment, the imaging lens 1 satisfies the following conditional expression (3) when R212 is the radius of curvature of the image side surface of the negative lens L21 and R221 is the radius of curvature of the object side surface of the negative meniscus lens L22.

$$-0.2 < (R212+R221)/(R212-R221) < 0.2 \qquad (3)$$

By satisfying the conditional expression (3), occurrence of various kinds of aberrations can be shared and suppressed between the image side lens surface of the negative lens L21 and the object side lens surface of the negative meniscus lens L22, and aberration correction performance in the second lens group G2 is improved. If the upper limit value is exceeded, the aberration occurring on the object side lens surface of the negative meniscus lens L22 increases. On the other hand, if it falls below the lower limit value, the aberration on the image side lens surface of the negative lens L21 increases and aberration correction becomes difficult.

Further, in the imaging lens 1, when f2n is a composite focal length of the negative lens L21 and the negative meniscus lens L22 in the second lens group G2 and f2p is the focal length of the positive lens L23 in the second lens group G2, the conditional expression (4) is satisfied.

$$-0.95 < f2n/f2p < -0.65 \qquad (4)$$

By satisfying the conditional expression (4), the aberration occurring in the negative lens L21 and the negative meniscus lens L22 which are lenses having negative power in the second lens group G2, is corrected by positive power of a positive lens L23 which is a lens having positive power in the second lens group G2. It should be noted that since f2n is negative and f2p is positive, f2n/f2p takes a negative value in conditional expression (4).

When f2p is large, that is, when the focal length of the positive lens L23 is large relative to f2n, f2n/f2p is larger than −0.65 shown in the conditional expression (4). In other words, if the value exceeds the upper limit of the conditional expression (4), the focal length of the positive lens L23 becomes relatively long, so that the aberration caused by the negative lens group in the second lens group G2 tends to be insufficiently corrected. On the other hand, if f2n is large, that is, f2n is smaller than the lower limit value of conditional expression (4), the focal length of the positive lens L23 is relatively short, that is, the correction tends to be excessive.

Further, it is preferable to set the upper limit value and the lower limit value of the conditional expression (4) within the range of $-0.9 < f2n/f2p < -0.7$ since the accuracy is more improved.

Further, in the imaging lens 1, when f2 is the focal length of the second lens group G2 and f is the focal length of the entire imaging lens 1 in the case focusing on an object at infinity, it is desirable to satisfy the conditional expression (5).

$$0.1 < f/f2 < 0.4 \qquad (5)$$

With such a configuration, the second lens group G2 can sufficiently correct various aberrations while securing back focus while reducing the angle of incidence on the image plane.

Further, it is desirable that the imaging lens 1 satisfy the conditional expression (6) when f1 is the focal length of the first lens group G1.

$$0.6 < f1/f < 0.9 \qquad (6)$$

With such a configuration, focusing up to a short distance is performed with a small amount of movement while sufficiently correcting aberration fluctuations during focusing. It should be noted that the term "focusing" as used herein refers to an operation in which the first lens group G1 moves to the object side or the image side to change the focal length of the entire system of the imaging lens 1.

Furthermore, in order to miniaturize the imaging lens 1, it is desirable that the second lens group G2 does not move with respect to the image plane P at the time of focusing from an infinity focused state to a close range object. With this configuration, since the second lens group G2 is fixed with respect to the image plane, it is possible to perform focusing with a simple configuration that moves only the first lens group G1.

Further, in the present embodiment, it is desirable that the first lens group G1 is arranged in the order of a positive lens, a positive lens, a negative lens, an aperture stop, a negative lens, a positive lens, and a positive lens from the object side. With such a configuration, since the power arrangement is symmetrical with respect to the open diaphragm S, various aberrations can be sufficiently corrected.

In the present embodiment, the negative meniscus lens L22 is used, but a spherical lens may be used for all the lenses.

Further, by forming all lenses constituting the imaging lens with "inorganic solid material", it is possible to realize an imaging lens which is less susceptible to changes in environmental conditions such as temperature and humidity. Exemplary inorganic solid material includes glass.

Examples of the configuration of the imaging lens 1 that at least satisfies the conditional expression (1) as described above are shown in Tables 1 to 4 as numerical values. For all the examples, the maximum image height is 5.5 mm.

EXAMPLE

Hereinafter, Examples 1 to 4 are cited as concrete examples of the imaging lenses showing the embodiments in FIGS. 2 to 5.

Each of Examples 1 to 4 is a numerical example satisfying the conditional expression (1) already described. In addition to the conditional expression (1), any one or all of the conditional expressions (2) to (6) are satisfied, but the present invention is not limited to such a configuration.

The imaging lenses of these embodiments are configured as a compact imaging lenses while having a relatively large aperture with an angle of view of about 18 degrees and an F-number of about 2.0.

The signs in the respective examples are defined as follows.
f: focal length of the entire system
F: F-number
ω: half angle of view (half field angle in the state focused on infinity)
R: radius of curvature
D: interplanar distance
N: refractive index
ν: abbe number
Φ: light effective diameter Numerical Example 1 f=35.0 mm, F=2.0, 2ω=17.8 degrees

Data of the Example 1

TABLE 1A

|   | R | D | N | ν | Φ | GLASS |
|---|---|---|---|---|---|---|
| 1 | 32.496 | 4.14 | 1.60300 | 65.44 | 17.5 | S-PHM53 (OHARA) |
| 2 | −84.046 | 0.30 |   |   | 17.0 |   |
| 3 | 13.842 | 2.03 | 1.85026 | 32.27 | 15.6 | S-LAH71 (OHARA) |
| 4 | 18.344 | 1.12 |   |   | 14.6 |   |
| 5 | 17.830 | 1.20 | 1.62588 | 35.70 | 13.8 | S-TIM1 (OHARA) |
| 6 | 9.350 | 3.47 |   |   | 12.1 |   |
| 7 | STOP | 3.03 |   |   | 11.6 |   |
| 8 | −13.124 | 4.50 | 1.69895 | 30.13 | 10.9 | S-TIM35 (OHARA) |
| 9 | 20.191 | 6.17 | 1.71300 | 58.87 | 12.0 | S-LAL8 (OHARA) |
| 10 | −18.997 | 0.30 |   |   | 12.6 |   |

TABLE 1A-continued

|   | R | D | N | ν | Φ | GLASS |
|---|---|---|---|---|---|---|
| 11 | 39.694 | 2.21 | 1.83481 | 42.72 | 13.1 | S-LAL55V (OHARA) |
| 12 | −89.770 | A |   |   | 13.1 |   |
| 13 | 108.598 | 1.20 | 1.68893 | 31.07 | 12.4 | S-TIM28 (OHARA) |
| 14 | 12.702 | 4.07 |   |   | 12.0 |   |
| 15 | −11.676 | 1.20 | 1.51633 | 64.14 | 12.3 | S-BSL7 (OHARA) |
| 16 | −18.599 | 0.30 |   |   | 13.6 |   |
| 17 | 36.934 | 3.49 | 1.85150 | 40.78 | 15.2 | S-LAH89 (OHARA) |
| 18 | −26.901 | 15.33 |   |   | 15.4 |   |
| 19 | ∞ | 0.75 | 1.51633 | 64.14 |   | FILTER, ETC |
| 20 | ∞ |   |   |   |   |   |

<Variable Distance>

TABLE 1B

|   | Inf. | ×0.2 | ×0.40 |
|---|---|---|---|
| A | 2.00000 | 6.64354 | 11.28707 |

<Parameter Values in Conditional Expressions>

TABLE 1C

| f21/f22 | 0.33 |
|---|---|
| Bf/D2 | 1.64 |
| (R212 + R221)/(R212 − R221) | 0.04 |
| f2n/f2p | −0.82 |
| f/f2 | 0.26 |
| f1/f | 0.81 |

Numerical Example 2 f=35.0 mm, F=2.0, 2ω=17.8 degrees

Data of the Example 2

TABLE 2A

|   | R | D | N | ν | Φ | GLASS |
|---|---|---|---|---|---|---|
| 1 | 33.699 | 4.20 | 1.61800 | 63.33 | 17.5 | S-PHM52 (OHARA) |
| 2 | −85.029 | 0.30 |   |   | 17.0 |   |
| 3 | 13.767 | 2.03 | 1.85026 | 32.27 | 15.6 | S-LAH71 (OHARA) |
| 4 | 18.202 | 1.12 |   |   | 14.6 |   |
| 5 | 17.573 | 1.20 | 1.63980 | 34.47 | 13.8 | S-TIM27 (OHARA) |
| 6 | 9.371 | 3.29 |   |   | 12.1 |   |
| 7 | STOP | 3.20 |   |   | 11.7 |   |
| 8 | −13.196 | 4.50 | 1.69895 | 30.13 | 11.2 | S-TIM35 (OHARA) |
| 9 | 20.259 | 6.24 | 1.71300 | 53.87 | 12.6 | S-LAL8 (OHARA) |
| 10 | −19.083 | 0.30 |   |   | 13.4 |   |
| 11 | 39.632 | 2.21 | 1.83481 | 42.72 | 14.0 | S-LAH55V (OHARA) |
| 12 | −90.398 | 2.00 |   |   | 13.9 |   |
| 13 | 107.710 | 1.20 | 1.68893 | 31.07 | 13.1 | S-TIM28 (OHARA) |
| 14 | 12.709 | 4.08 |   |   | 12.5 |   |
| 15 | −11.684 | 1.20 | 1.51633 | 64.14 | 12.8 | S-BSL7 (OHARA) |
| 16 | −18.623 | 0.30 |   |   | 14.1 |   |
| 17 | 36.981 | 3.49 | 1.85150 | 40.78 | 15.8 | S-LAH89 (OHARA) |
| 18 | −26.913 | 15.34 |   |   | 16.0 |   |
| 19 | ∞ | 0.75 | 1.51633 | 64.14 |   | FILTER, ETC |
| 20 | ∞ |   |   |   |   |   |

<Variable Distance>

TABLE 2B

|   | Inf. | ×0.2 | ×0.40 |
|---|---|---|---|
| A | 2.00000 | 6.64617 | 11.29234 |

<Parameter Values in Conditional Expressions>

TABLE 2C

| | |
|---|---|
| f21/f22 | 0.33 |
| Bf/D2 | 1.64 |
| (R212 + R221)/(R212 − R221) | 0.04 |
| f2n/f2p | −0.82 |
| f/f2 | 0.26 |
| f1/f | 0.81 |

Numerical Example 3 f=35.0 mm, F=2.0, 2ω=17.8 degrees

Data of the Example 3

TABLE 3A

| | R | D | N | ν | φ | GLASS |
|---|---|---|---|---|---|---|
| 1 | 53.872 | 4.50 | 1.59522 | 67.73 | 17.5 | S-FPM2 (OHARA) |
| 2 | −68.277 | 0.30 | | | 17.2 | |
| 3 | 14.752 | 2.38 | 1.78590 | 44.20 | 16.1 | S-LAH51 (OHARA) |
| 4 | 26.491 | 0.68 | | | 15.3 | |
| 5 | 18.377 | 1.20 | 1.51823 | 58.90 | 14.4 | S-NSL3 (OHARA) |
| 6 | 9.327 | 3.51 | | | 12.6 | |
| 7 | STOP | 3.17 | | | 12.1 | |
| 8 | −14.743 | 4.50 | 1.71736 | 29.52 | 11.2 | S-TIH1 (OHARA) |
| 9 | 19.133 | 5.07 | 1.71300 | 53.87 | 12.0 | S-LAL8 (OHARA) |
| 10 | −19.192 | 0.30 | | | 12.4 | |
| 11 | 31.669 | 2.16 | 1.83481 | 42.72 | 12.9 | S-LAH55V (OHARA) |
| 12 | −120.942 | 2.00 | | | 12.8 | |
| 13 | 63.546 | 1.20 | 1.80000 | 29.84 | 11.8 | S-NBH55 (OHARA) |
| 14 | 10.839 | 3.85 | | | 11.2 | |
| 15 | −10.338 | 3.51 | 1.71300 | 53.87 | 11.5 | S-LAL8 (OHARA) |
| 16 | −15.015 | 0.30 | | | 14.4 | |
| 17 | 31.719 | 3.89 | 1.83481 | 42.72 | 16.8 | S-LAH55V (OHARA) |
| 18 | −29.302 | 14.33 | | | 16.8 | |
| 19 | ∞ | 0.75 | 1.51633 | 64.14 | | FILTER, ETC |
| 20 | ∞ | | | | | |

<Variable Distance>

TABLE 3B

| | Inf. | ×0.2 | ×0.40 |
|---|---|---|---|
| A | 2.00000 | 5.60117 | 9.20234 |

<Parameter Values in Conditional Expressions>

TABLE 3C

| | |
|---|---|
| f21/f22 | 0.24 |
| Bf/D2 | 1.24 |
| (R212 + R221)/(R212 − R221) | 0.02 |
| f2n/f2p | −0.73 |

TABLE 3C-continued

| | |
|---|---|
| f/f2 | 0.48 |
| f1/f | 0.72 |

Numerical Example 4 f=35.0 mm, F=2.0, 2ω=17.8 degrees

Data of the Example 4

TABLE 4A

| | R | D | N | ν | φ | GLASS |
|---|---|---|---|---|---|---|
| 1 | 41.437 | 4.50 | 1.59522 | 67.73 | 17.5 | S-FPM2 (OHARA) |
| 2 | −74.270 | 0.30 | | | 17.1 | |
| 3 | 14.109 | 2.38 | 1.85150 | 40.78 | 15.8 | S-LAH89 (OHARA) |
| 4 | 24.543 | 0.93 | | | 14.9 | |
| 5 | 20.318 | 1.20 | 1.57501 | 41.50 | 14.0 | S-TIL27 (OHARA) |
| 6 | 9.032 | 3.36 | | | 12.2 | |
| 7 | STOP | 3.14 | | | 11.8 | |
| 8 | −14.368 | 4.50 | 1.71736 | 29.52 | 11.1 | S-TIH1 (OHARA) |
| 9 | 19.850 | 5.81 | 1.71300 | 53.87 | 12.1 | S-LAL8 (OHARA) |
| 10 | −19.332 | 0.30 | | | 12.6 | |
| 11 | 30.332 | 2.19 | 1.83481 | 42.72 | 13.1 | S-LAH55V (OHARA) |
| 12 | −140.123 | 2.00 | | | 13.0 | |
| 13 | 55.096 | 1.20 | 1.71736 | 29.52 | 12.0 | S-TIH1 (OHARA) |
| 14 | 10.299 | 3.81 | | | 11.3 | |
| 15 | −11.409 | 3.22 | 1.56384 | 60.67 | 11.6 | S-BAL41 (OHARA) |
| 16 | −19.411 | 0.30 | | | 14.2 | |
| 17 | 28.933 | 3.86 | 1.85150 | 40.78 | 16.2 | S-LAH89 (OHARA) |
| 18 | −29.190 | 11.89 | | | 16.3 | |
| 19 | ∞ | 0.75 | 1.51633 | 64.14 | | FILTER, ETC |
| 20 | ∞ | | | | | |

<Variable Distance>

TABLE 4B

| | Inf. | ×0.2 | ×0.40 |
|---|---|---|---|
| A | 2.00000 | 5.89798 | 9.79596 |

<Parameter Values in Conditional Expressions>

TABLE 4C

| | |
|---|---|
| f21/f22 | 0.31 |
| Bf/D2 | 1.08 |
| (R212 + R221)/(R212 − R221) | −0.05 |
| f2n/f2p | −0.77 |
| f/f2 | 0.49 |
| f1/f | 0.75 |

FIGS. 6 to 9 show aberration diagrams of the four imaging lenses shown as examples.

In FIGS. 6 to 9, 6A to 9A shows the aberration curve in the case of focusing at infinity, 6B to 9B shows the aberration curve in the case of focusing on the object whose magnification is −0.2 times, 6C to 9C shows an aberration curve in the case of focusing on the object whose magnification is −0.4 times. The broken line in the spherical aberration diagram indicates a sine condition. F is an F-number, and Fe is an effective F-number. Y' is an image height. Also, the solid line in the astigmatic aberration diagram indicates a sagittal plane, and the broken line in the astigmatic aberration diagram indicates a meridional plane. Further, the thin line is the aberration curve diagram for the d line (d line means the light which has the wave length 587.56 nm) and the thick line is the aberration curve diagram for the g line (g line means the light which has the wave length 435.84 nm). Regarding to the comatic aberration diagrams, since they have the same scale, each of the scale is omitted in the diagrams except for the lowest diagram.

As shown in the aberration diagrams of the respective embodiments, aberrations are corrected at high levels in each embodiment, and changes in field curvature due to focusing are also suppressed. The spherical aberration varies with focusing, but the amount of change is sufficiently small as an absolute value.

Axial chromatic aberration and chromatic aberration of magnification are small, comatic aberration and disorder of color difference are well suppressed up to the most peripheral portion, and distortion aberration is corrected sufficiently small.

That is, in all of the imaging lenses of Examples 1 to 4, various aberrations are sufficiently reduced, the imaging power has resolving power corresponding to an imaging element of 5 to 10 million pixels, the absolute value of distortion aberration is 0.5%, which is a high-performance imaging lens with little performance change due to focusing.

Figure 10:
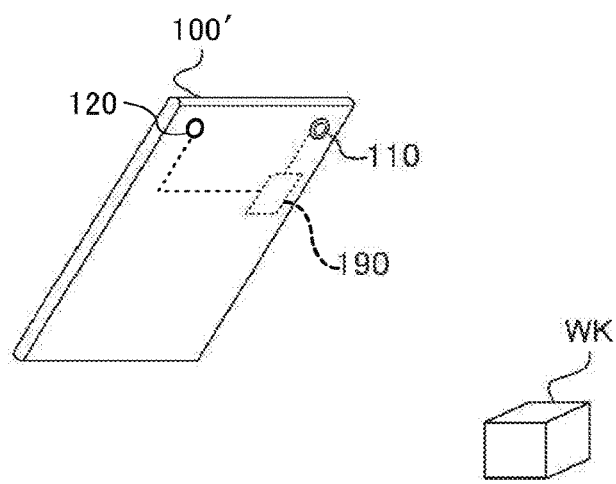
FIG. 10 is a diagram for explaining another embodiment of the imaging apparatus.

With reference to FIG. 10, the configuration of a portable or mobile terminal 100' such as a phone or tablet will be described as an example of a portable information terminal having the imaging lens 1 as an imaging optical system.

The mobile terminal 100' is an information communication terminal including a camera function unit 110 serving as an imaging unit on the back side and a control unit 190. Also, the mobile terminal 100' of this example includes an illumination device 120.

When the user tries to photograph the work piece WK as a subject, the user operates the camera function unit 110 by the control unit 190 with the camera function unit 110 of the mobile terminal 100 directing toward the work piece WK.

The camera function unit 110 has a function as an image pickup apparatus including the imaging lens according to the image forming lens 1 as an imaging optical system. The camera function unit 110 has a function of adjusting the focal length of the entire system so as to drive the first lens group G1 of the imaging lens 1 to appropriately photograph the work piece WK based on an instruction from the control unit 190. The camera function unit 110 may be structured as illustrated in FIG. 1, and the lenses may be focused and/or zoomed using a motor, or other conventional moving hardware.

The control unit 190 configured as a programmed computer, a CPU, circuitry, processing circuitry or the like performs driving of the first lens group G1 and blinking of the illumination device 120 such as a LED, for example, and controls the focusing of the imaging lens and the image acquisition by the image pickup element in the camera function unit 110.

As described above, according to the embodiments, it is possible to realize a novel image forming lens and an imaging apparatus using the imaging lens.

Figure 11:
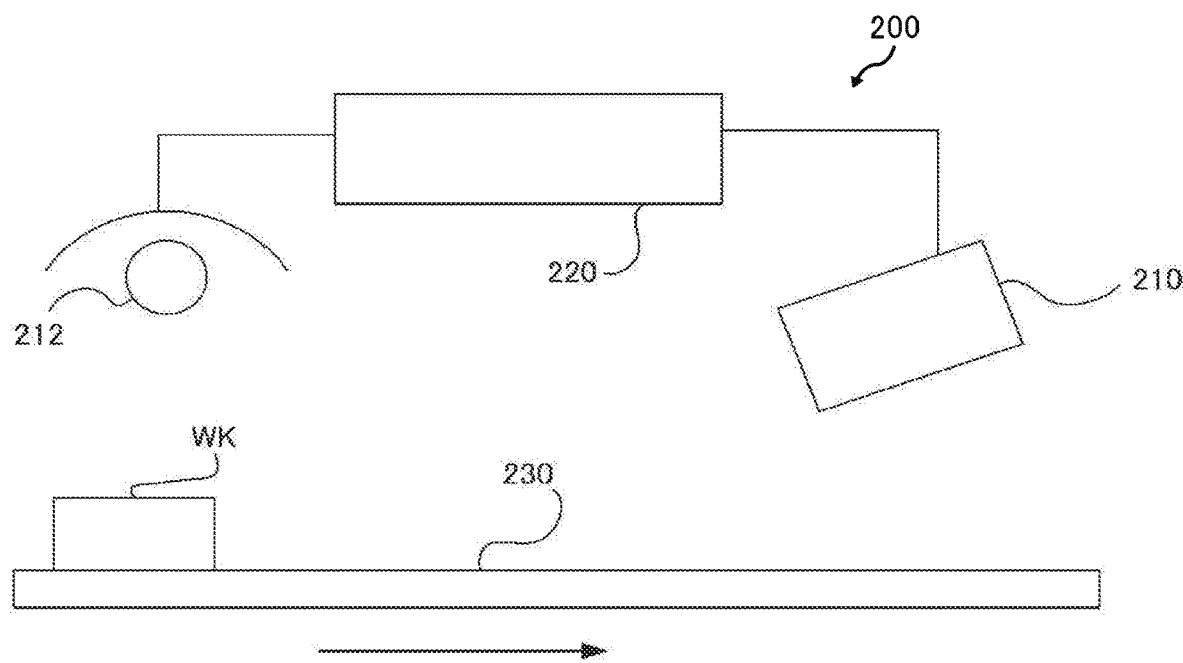
FIG. 11 is a diagram for explaining an example of an inspection apparatus using an imaging lens.

Further, as an example of an inspection apparatus that has an imaging unit having the image forming lens corresponding to one of the present embodiments as an imaging optical system and performs an inspection using the imaging unit, an inspection device 200 as shown in FIG. 11 will be described.

The inspection device 200 includes an imaging device 210 having an imaging optical system, a control unit 220, and a lighting device 212 such as a LED, for example, for illuminating a subject to be imaged by the imaging device 210 based on an instruction from the control unit 220. The imaging device 210 may be structured as illustrated in FIG. 1, and the lenses may be focused and/or zoomed using a motor, or other conventional moving hardware.

The inspection apparatus 200 conducts a product inspection, the inspection apparatus 200 images the work piece WK as an inspection target using the imaging device 210 while conveying the work piece WK by the conveyor 230 from the left to the right in the figure.

As the imaging device 210, the imaging lens 1 according to any one of the embodiments above, specifically, for example, one shown in any one of Examples 1 to 4 is used as an imaging optical system.

The control means 220 configured as a programmed computer, a CPU, circuitry, processing circuitry or the like controls driving of the conveyor 230 and blinking of the illumination device 212, and also controls the focusing of the imaging lens and the image acquisition by the image pickup element in the imaging apparatus 10. The conveyor 230 has a belt and rollers, but it may have other conventional structures.

Products of various sizes are subjected to inspection as a work piece WK and the control means 220 specifies an appropriate working distance according to the size of the work WK and controls the focusing of the imaging lens according to the specified working distance.

As described above, according to one of the embodiments, it is possible to realize a novel imaging lens and an inspection apparatus using the imaging lens.

Although the preferred embodiments of the present invention have been described above, the present invention is not limited to the above-described configuration, and it is possible to adopt various configurations within the scope of the gist of the invention described in the claims.

For example, the image forming lens of the present invention can be used not only for imaging devices such as cameras but also for input devices for machine vision and the like.

The advantage described in the embodiments merely lists preferable effects produced by the invention, and the effect of the invention is not limited as described in the embodiment.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An image forming lens, comprising:
a first lens group having positive refractive power, the first lens group being moved toward an object side when focusing from a long distance to a short distance; and
a second lens group having positive refractive power arranged closer to an image side than the first lens group, the second lens group including, in order from the object side to the image side, a negative lens having a concave surface on the image side, a negative meniscus lens having a concave surface on the object side, and a positive lens,
wherein the negative lens is immediately adjacent to both the negative meniscus lens and the first lens group, and a focal length f21 of the negative lens and a focal length f22 of the negative meniscus lens satisfy the following conditional expression:

$$0.1 < f21/f22 < 0.5.$$

2. The image forming lens according to claim 1, wherein:
an optical path length Bf defined as a distance from a most image side surface of the second lens group to an image plane, and an axial thickness of the second lens group D2 satisfy the following conditional expression:

$$0.8 < Bf/D2 < 2.0.$$

3. The image forming lens according to claim 1, wherein:
a radius of curvature of the concave surface on the image side of the negative lens R212, and a radius of curvature of a surface on the object side of the negative lens R221 satisfy the following conditional expression:

$$-0.2 < (R212+R221)/(R212-R221) < 0.2.$$

4. The image forming lens according to claim 1, wherein:
a composite focal length of the negative lens and the negative meniscus lens f2n, and a focal length of the positive lens f2p satisfy the following conditional expression:

$$-0.95 < f2n/f2p < -0.65.$$

5. The image forming lens according to claim 1, wherein:
a focal length f2 of the second lens group, and a focal length f of the entire system of the imaging lens when focused on an object at infinity satisfy the following conditional expression:

$$0.1 < f/f2 < 0.6.$$

6. The image forming lens according to claim 1, wherein:
a focal length f1 of the first lens group, a composite focal length f of the first lens group and the second lens group satisfy the conditional expression:

$$0.6 < f1/f < 0.9.$$

7. The image forming lens according to claim 1, wherein:
the second lens group is fixed with respect to an image plane during focusing.

8. The image forming lens according to claim 1, wherein:
the first lens group comprises, in order from the object side to the image side; a first positive lens; a second positive lens; a first negative lens; an aperture stop; a second negative lens; a third positive lens, and a fourth positive lens.

9. An imaging apparatus, comprising:
the image forming lens according to claim 1.

10. An inspection apparatus, comprising:
an imaging camera that includes the image forming lens according to claim 1, the imaging camera being used to perform an inspection.

11. The image forming lens of claim 1, wherein the positive lens is immediately adjacent to the negative meniscus lens.

12. An image forming lens, comprising:
a first lens group having positive refractive power, the first lens group being moved toward an object side when focusing from a long distance to a short distance; and
a second lens group having positive refractive power arranged closer to an image side than the first lens group, the second lens group consisting of, in order from the object side to the image side, a negative lens having a concave surface on the image side, a negative meniscus lens having a concave surface on the object side, and a positive lens,
wherein the negative lens is immediately adjacent to the negative meniscus lens and a focal length f21 of the negative lens and a focal length f22 of the negative meniscus lens satisfy the following conditional expression:

$$0.1 < f21/f22 < 0.5, \text{ and}$$

the first lens group comprises, in order from the object side to the image side, a first positive lens, a second positive lens, a first negative lens, an aperture stop, a second negative lens, a third positive lens, and a fourth positive lens.

13. An image forming lens, comprising:
a first lens group having positive refractive power, the first lens group being moved toward an object side when focusing from a long distance to a short distance; and
a second lens group having positive refractive power arranged closer to an image side than the first lens group, the second lens group consisting of, in order from the object side to the image side, a negative lens having a concave surface on the image side, a negative meniscus lens having a concave surface on the object side, and a positive lens,
wherein the negative lens is immediately adjacent to the negative meniscus lens and a focal length f21 of the negative lens and a focal length f22 of the negative meniscus lens satisfy the following conditional expression:

$$0.1 < f21/f22 < 0.5, \text{ and}$$

an optical path length Bf defined as a distance from a most image side surface of the second lens group to an image plane, and an axial thickness of the second lens group, D2 satisfy the following conditional expression:

$$0.8 < Bf/D2 < 2.0.$$

* * * * *